(12) United States Patent
Inoue

(10) Patent No.: US 10,461,381 B2
(45) Date of Patent: Oct. 29, 2019

(54) BATTERY COOLING APPARATUS

(71) Applicant: DENSO CORPORATION, Kariya, Aichi-pref. (JP)

(72) Inventor: Yoshimitsu Inoue, Chiryu (JP)

(73) Assignee: DENSO CORPORATION, Kariya (JP)

( * ) Notice: Subject to any disclaimer, the term of this patent is extended or adjusted under 35 U.S.C. 154(b) by 183 days.

(21) Appl. No.: 14/294,488

(22) Filed: Jun. 3, 2014

(65) Prior Publication Data

US 2014/0356660 A1   Dec. 4, 2014

(30) Foreign Application Priority Data

Jun. 3, 2013  (JP) ................................. 2013-117043

(51) Int. Cl.
| | |
|---|---|
| *H01M 10/613* | (2014.01) |
| *H01M 10/625* | (2014.01) |
| *H01M 10/6556* | (2014.01) |
| *H01M 10/6563* | (2014.01) |
| *H01M 10/6551* | (2014.01) |
| *H01M 10/6557* | (2014.01) |
| *H01M 10/6555* | (2014.01) |
| *H01M 10/6565* | (2014.01) |

(52) U.S. Cl.
CPC ....... *H01M 10/613* (2015.04); *H01M 10/625* (2015.04); *H01M 10/6551* (2015.04); *H01M 10/6555* (2015.04); *H01M 10/6557* (2015.04); *H01M 10/6565* (2015.04); *H01M 2220/20* (2013.01)

(58) Field of Classification Search
CPC ..................................... H01M 10/613–10/625
USPC .......................................... 429/61–62, 71–72
See application file for complete search history.

(56) References Cited

U.S. PATENT DOCUMENTS 5,937,664 A * 8/1999 Matsuno ............ B60H 1/00278
62/186
2004/0232891 A1   11/2004 Kimoto et al.

FOREIGN PATENT DOCUMENTS

| JP | 2004-288527 | 10/2004 | |
|---|---|---|---|
| JP | 2005-183163 | 7/2005 | |
| JP | 2008-041461 | * 2/2008 | ............ H01M 10/50 |
| JP | 2008-290636 | * 12/2008 | ............ H01M 10/50 |

(Continued)

OTHER PUBLICATIONS

Office Action (2 pages) dated May 19, 2015, issued in corresponding Japanese Application No. 2013-117043 and English translation (2 pages).

*Primary Examiner* — Osei K Amponsah
(74) *Attorney, Agent, or Firm* — Nixon & Vanderhye P.C.

(57) ABSTRACT

A battery cooling apparatus includes a case for housing battery cells and a fan device disposed in the case for blowing air through a circulation passage to cool the battery cells. The case includes a discharge passage which makes communication between inside and outside of the case to allow part of the air circulating through the circulation passage to leak to outside the case. The fan device includes a first inflow passage and a second inflow passage. The first inflow passage, which is part of the circulation passage, is provided to allow the air having cooled the battery cells to be sucked into the fan device. The second inflow passage makes communication between the outside of the case and the fan device to allow air outside the case to be sucked into the circulation passage by suction force of the fan device.

8 Claims, 3 Drawing Sheets

(56) References Cited

FOREIGN PATENT DOCUMENTS

| JP | 2010-050000 | | 3/2010 | |
|---|---|---|---|---|
| JP | 2011-134615 | * | 7/2011 | ............ H01M 10/50 |

* cited by examiner

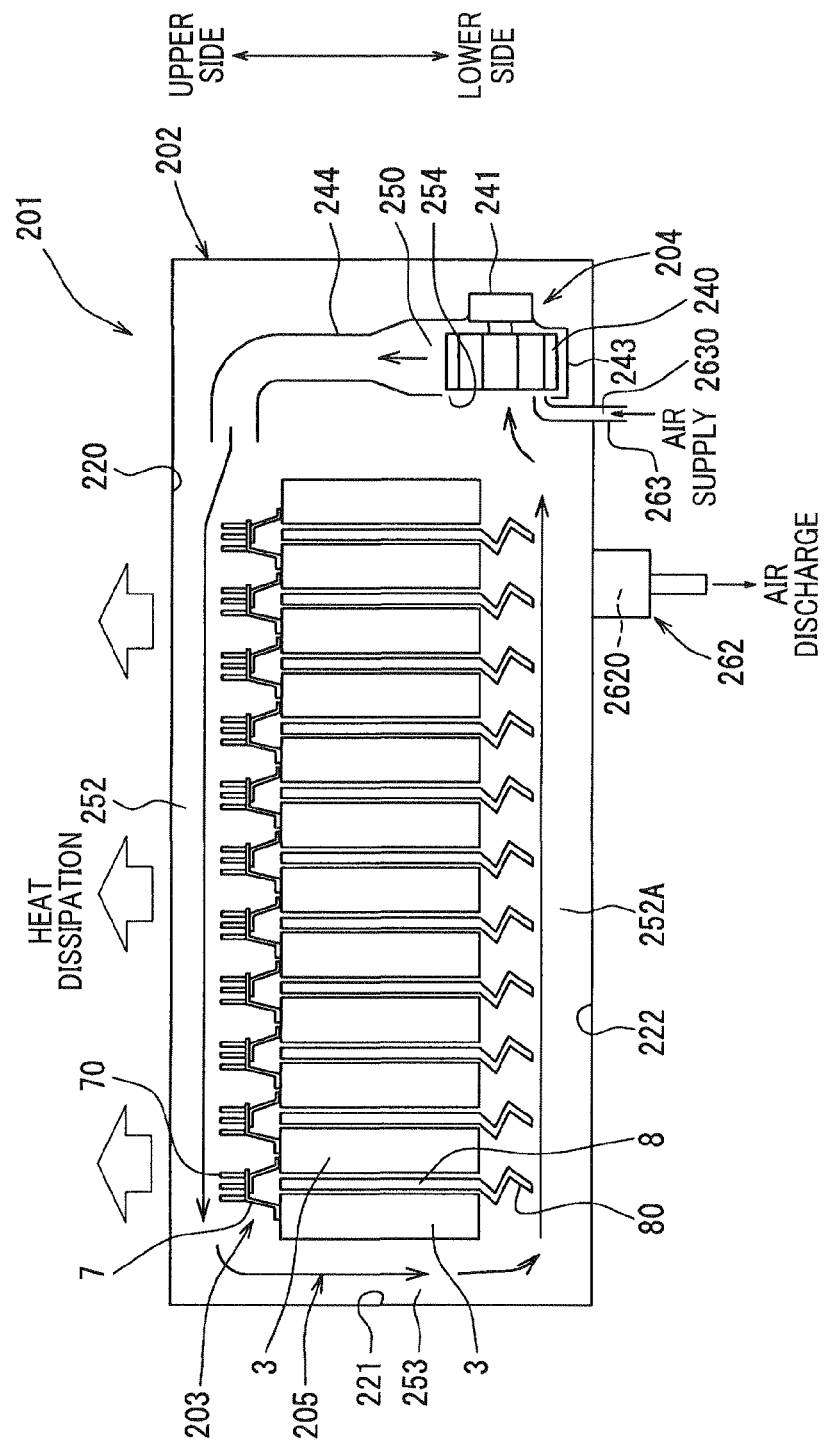

BATTERY COOLING APPARATUS

This application claims priority to Japanese Patent Application No. 2013-117043 filed on Jun. 3, 2013, the entire contents of which are hereby incorporated by reference.

BACKGROUND OF THE INVENTION

1. Field of the Invention

The present invention relates to a battery cooling apparatus for cooling battery cells housed in a case.

2. Description of Related Art

It is known to cool battery cells housed in a case using a battery cooling apparatus. For example, refer to Japanese Patent Application Laid-open No. 2010-50000 (Patent document 1) and Japanese Patent Application Laid-open No. 2004-288527 (Patent document 2).

The battery cooling apparatus described in Patent document 1 includes a cooling plate disposed so as to be in contact with a battery block of battery cells. The cooling plate has a hollow part which is filled with cooling liquid, and is provided with a heat exchanger. The heat exchanger is connected with a coolant passage through which a coolant is supplied. The heat exchanger is cooled by the vaporization heat of the coolant to cool the cooling liquid so that the battery cells are cooled by the cooling plate.

The battery cooling apparatus described in Patent document 2 includes a battery assembly having a heat transfer medium passage for passing heat transfer medium between single batteries, a feed means for feeding the heat transfer medium, a feed passage for supplying the heat transfer medium to the heat transfer medium passage, and a discharge passage for discharging the heat transfer medium from the heat transfer medium passage. The battery assembly, feed means, feed passage and discharge passage are provided in a case. The heat transfer medium fed by the feed means flows through the feed passage, heat transfer medium passage and discharge passage in this order, and returns to the feed means. The heat transfer medium flows through a closed circuit while cooling the single batteries.

However, the battery cooling apparatus described in Patent document 1 has a problem in that since the batteries are cooled by the vaporization heat of the coolant using refrigeration cycle equipment, the manufacturing cost is high. In a case where the refrigeration cycle equipment is housed in the case that houses the batteries, since a tube for passing the coolant has to be provided inside the case, the manufacturing cost further increases.

The battery cooling apparatus described in Patent document 2 has the structure in which the batteries are disposed in a closed space within the case so that the temperature of the batteries can be adjusted by circulating the heat transfer medium in a closed circuit. Accordingly, since heat dissipation from inside the case to outside the case is performed only by natural convection of the circulating heat transfer medium, it is difficult to sufficiently cool the batteries.

If the battery cooling apparatus described in Patent document 2 is modified to employ a non-circulation method in which the batteries are cooled by air sucked from outside the case, and the air having cooled the batteries is discharged to outside the case, there arises another problem that noise easily propagates to the outside because the cooling passage is open to the outside of the case. Further, in this case, dust can easily enter the case, and dew condensation easily occurs inside the case. In addition, it is necessary to take measures of reducing effects of discharged air flow on the ambient environment.

SUMMARY

An exemplary embodiment provides a battery cooling apparatus comprising:

a case for housing battery cells;

a fan device disposed in the case for blowing air to cool the battery cells;

a circulation passage formed inside the case, the air blown from the fan device being sucked into the fan device after having circulated through the circulation passage and having exchanged heat with the battery cells; and a discharge passage making communication between inside and outside of the case to allow part of the air circulating through the circulation passage to leak to outside the case through the discharge passage after having exchanged heat with the battery cells;

wherein the fan device includes a first inflow passage and a second inflow passage, the first inflow passage being part of the circulation passage and allowing the air having exchanged heat with the battery cells to be sucked into the fan device through the first inflow passage, the second inflow passage making communication between the outside of the case and the fan device to allow air outside the case to be sucked into the circulation passage through the second inflow passage by suction force of the fan device.

According to the exemplary embodiment, there is provided a noiseless battery cooling apparatus capable of sufficiently cooling battery cells housed in a case thereof without using refrigeration cycle equipment.

Other advantages and features of the invention will become apparent from the following description including the drawings and claims.

BRIEF DESCRIPTION OF THE DRAWINGS

In the accompanying drawings:

FIG. 3 is a diagram for explaining flows of air for battery cooling in a battery cooling apparatus according to a third embodiment of the invention.

PREFERRED EMBODIMENTS OF THE INVENTION

Figure 1:
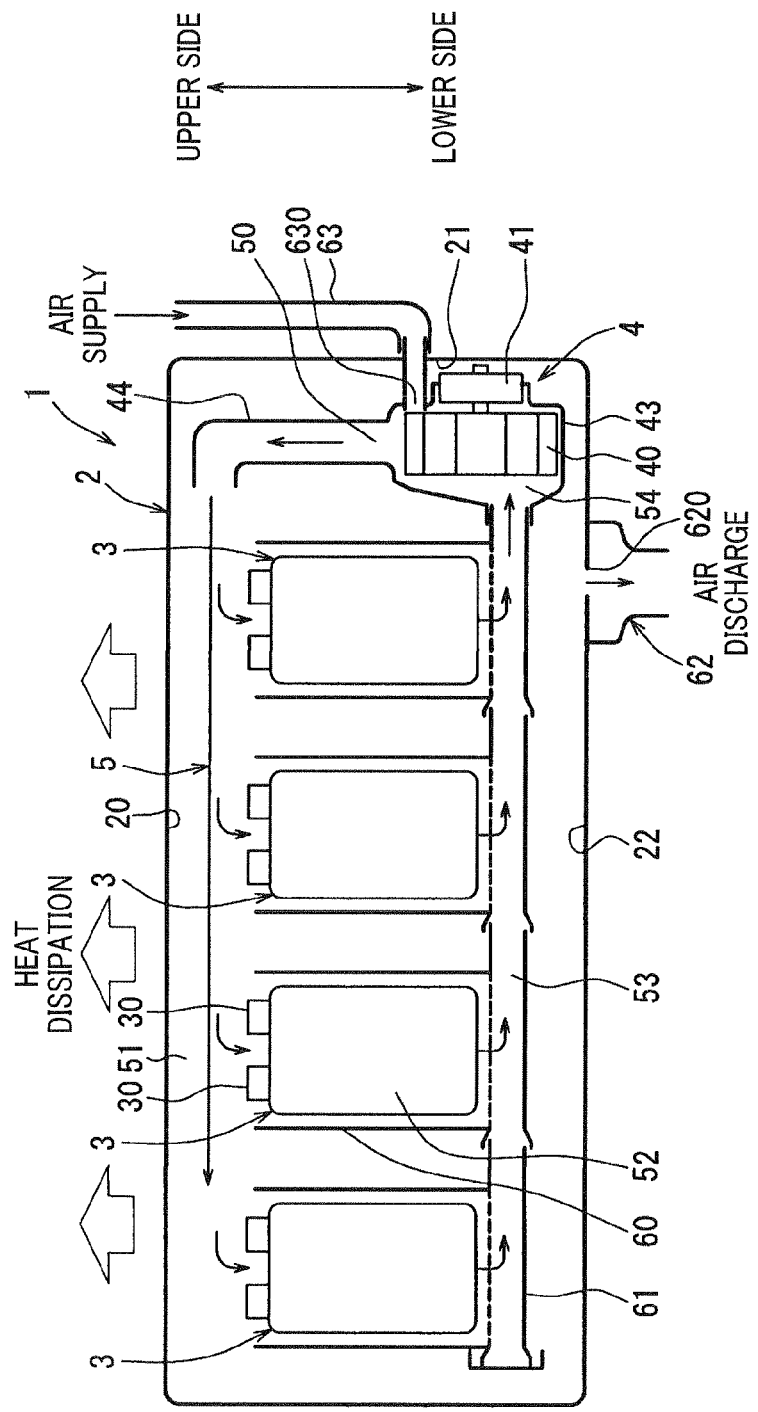
FIG. 1 is a diagram for explaining flows of air for battery cooling in a battery cooling apparatus according to a first embodiment of the invention.

In the below described embodiments, parts or components which are the same or equivalent to those described in the preceding embodiments may be designated by the same reference numerals or characters. In the below described embodiments, when only part of the entire structure is explained, descriptions of the preceding embodiments can be referred to for the other parts. It should be noted that two or more of the below described embodiments can be combined when there is a statement to that effect, or if no substantive obstacle is expected in the combination.

First Embodiment

FIG. 1 is a diagram showing flows of air for battery cooling in a battery cooling apparatus 1 according to a first embodiment of the invention together with the structure of the battery cooling apparatus 1. The battery cooling apparatus 1 is used for a hybrid vehicle that uses as a vehicle driving engine a combination of an internal combustion engine and an electric motor powered by batteries, or an electric vehicle that uses as a vehicle driving engine an electric motor powered by batteries, for example. The battery cooling apparatus 1 includes a case 2 housing battery cells 3, which may be nickel hydrogen rechargeable batteries, rechargeable lithium-ion batteries, or organic radical batteries.

The case 2 houses also a fan device 4. The battery cells 3 are connected in series and stacked on one another. Inside the case 2, there is formed a circulation passage 5 through which the fan device 4 forcibly blows air. The circulation passage 5 is a passage which allows the air blown from the fan device 4 to flow to exchange heat with the battery cells 3 and thereafter be sucked into the fan device 4. As shown in FIG. 1, the circulation passage 5 is constituted of a first inflow passage 54, a blowoff passage 50, a top plate side passage 51, battery passages 52 and a collective passage 53.

Charging, discharging and temperature adjustment of the battery cells 3 are controlled by an electronic component (not shown). This electronic component may be a DC/DC converter, a motor for driving a fan member, or a component controlled by an inverter, and may be housed in the case 2. This electronic component may be disposed in the circulation passage 5 so that it can be cooled by the circulating air together with the battery cells 3. Further, the case 2 may house therein a cell monitoring unit for monitoring at least the voltage and temperature of the battery cells 3, a junction box and a service plug.

The case 2, which has a box shape having at least six wall surfaces, is formed as a molded article made of an aluminum or steel plate. The case 2 may be fabricated by assembling case members so as to form a box-shaped inner space therein. At least one of the wall surfaces of the case 2 may be formed with concaves and convexes to increase the heat dissipating area.

The battery cells 3 form cell stacks within the inner space of the case 2. As shown in FIG. 1, the cell stacks are arranged with regular spacings in a state of being surrounded by their battery cases 60 within the inner space of the case 2. Each battery case 60 opens to the inner space of the case 2 at the side of a top plate 20 of the case 2, and is connected to a collective duct 61 at the side of a bottom plate 22 of the case 2. Accordingly, the passages inside the respective battery cases 60 include independent entrances located at the side of the top plate 20, and include exits which connect to a collective passage 53 at the side of the bottom plate 22. The collective passage 53 extends along the bottom plate 22 to the inlet of a casing 43 under the cell stacks arranged with the regular spacings, and connects to the first inflow passage 54.

The first inflow passage 54, which constitutes part of the circulation passage 5, is provided in the case 2 to suck the air which has exchanged heat with the battery cells 3.

Accordingly, the air blown from the fan device 4 and reaching the top plate side passage 51 flows into the battery passages 52 of the battery cases 60 from their upper entrances.

The battery passages 52 may be inter-cell passages between respective adjacent two of the battery cells. The top plate side passage 51 is a passage formed between the top plate 20 and the battery cells 3. The air flowing through the battery passages 52 absorbs heat from the outer surfaces of the battery cells 3 to cool the battery cells 3. The air having cooled the battery cells 3 is collected in the collective passage 53 of the collective duct 61 from the exits of the battery cases 60, and sucked into the fan device 4 through the first inflow passage 54. In this embodiment, the outer package surfaces of the battery cells 3 serve as one of heat dissipating means.

Further, the air also contacts electrode terminals 30 including positive and negative terminals of the battery cells 30 and bus bars for electrical connection between the positive and negative terminals. Accordingly, the electrode terminals 30 and the bus bars constitute one of the heat dissipating means. The electrode terminals 30 and the bus bar are located at the upper side and the upstream side of the air flow in each battery case 60.

The fan device 4 is one example of an air blowing means for circulating air through the circulation passage 5 for cooling the battery cells 3. The fan device 4 includes a motor 41, a sirrocco fan 40 driven by the motor 41 and the casing 43 housing the sirrocco fan 40. The casing 43 forms the first inflow passage 54 which is part of the circulation passage 5.

In this embodiment, the fan device 4 is controlled by a control device incorporated in the cell monitoring unit (not shown) disposed in the case 2. The battery cells 3 generate heat when charged or discharged.

The cell monitoring unit continuously monitors the temperature of the battery cells 3, and controls the fan device 4 in accordance with the monitored temperature.

The first inflow passage 54, which extends in the rotation axis of the sirrocco fan 40, includes the inlet of the casing 43 through which the sirrocco fan 40 sucks air. As shown in FIG. 1, the sirrocco fan 40 is disposed at the lower side of the inner space of the case 2 so as to be close to a side plate 21 of the case 2. The motor 41 is located between the side plate 21 and the sirrocco fan 40. The rotation axis of the sirrocco fan 40 is parallel to the top plate 20 of the case 2. The first inflow passage 54 is located at the side of the battery cells 3 and connects to the collective passage 53. That is, the inlet of the casing 43 is connected to the collective duct 61 which forms the collective passage 53.

The casing 43 also forms the blowoff passage 50 which is part of the circulation passage 5. The blowoff passage 50 extends in the centrifugal direction of the sirrocco fan 40, that is in the direction perpendicular to the rotation axis of the sirrocco fan 40. The blowoff passage 50 is a passage extending in the direction perpendicular to the direction in which the first inflow passage 54 extends. Accordingly, the blowoff passage 50 extends upward within the inner space of the case 2. The outlet of the casing 43 is connected to a fan duct 44 extending upward. The fan duct 44 opens in the vicinity of the top plate 20 of the case 2. Accordingly, the blowoff passage 50 extends to the vicinity of the top plate 20 within the inner space of the case 2.

The circulation passage 5 is not exposed to any one of the wall surfaces of the case 2 at its part constituted of the fan duct 44, battery cases 60, collective duct 61 and the casing 43, but exposed to at least one of the wall surfaces of the case 2 at its part constituting the top plate side passage 51. The circulation passage 5 includes a passage part in which the air circulated in the case 2 by the fan device 4 flows while contacting at least one of the wall surfaces of the case 2. The top plate 20 is one of the wall surfaces of the case 2 which the circulating air contacts, and the top side passage 51 is the passage part in which the circulating air flows while contacting the top plate 20. The air blown from the fan device 4 passes through the blowoff passage 50 and reaches the vicinity of the top plate 20. This circulating air further flows through the top plate side passage 51 and flows into the battery passages 52 from the entrances of the respective battery cases 60 to exchange heat with the battery cells 30.

The circulating air dissipates heat absorbed from the battery cells 3 to outside the case 2 through the top plate 20 by natural convection. Accordingly, the entire of the top plate 20 serves as a heat dissipation surface for dissipating heat of the battery cells 3 housed in the case 2 to outside the case 2. Preferably, the top plate 20 which the air circulating in the circulation passage 5 contacts while passing through the top plate side passage 51 is the wall surface having the largest surface area of all the wall surfaces of the case 2 so that the battery cells 30 can be cooled efficiently. When the case 2 has a rectangular shape and the wall surface having the largest surface area is two or more in number, one of them is the top plate 20.

In this embodiment, two inflow passages are provided for the fan device 4. One is the first inflow passage 54 and the other is a second inflow passage 630.

The second inflow passage 630 makes communication between the fan device 4 and the outside of the case 2. The second inflow passage 630 is smaller in cross section than the first inflow passage 54. The second inflow passage 630 is the inner passage of a supply duct 63 connected to the back side part of the casing 43, which is located on the side opposite the inlet of the casing 43.

The supply duct 63 penetrates through the side plate 21 of the case 2 to make communication between the back side part of the casing 43 and the outside of the case 2. The second inflow passage 630 penetrates through one of the wall surfaces except the top plate 20, which the air circulating the circulation passage 5 contacts while passing through the top side passage 51.

The supply duct 63 extends upward along the side plate 21 outside the case 2. The top end of the supply duct 63 from which air flows into the supply duct 63 is located at a height approximately the same as the height of the top plate 20. The air sucked into the supply duct 63 is introduced into the circulation passage 5 through the second inflow passage 630, and taken in in the inner space of the case 2.

The battery cooling apparatus 1 includes a discharge passage 620 through which part of the air circulating in the case 2 leaks outside. The discharge passage 620 penetrates through the bottom plate 22 located under the collective duct 61 to make communication between the inside and outside of the case 2. Air outside the case 2 is sucked into the circulation passage 5 through the second inflow passage 630 by the suction force of the fan device 4.

The discharge passage 620 penetrates through one of the wall surfaces except the top plate 20 which the circulating air contacts while passing through the top plate side passage 51. The discharge passage 620 is formed of a small diameter hole penetrating through the case 2. Around this small diameter hole, there is formed a ring portion thinner than any other portions of the case 2. The diameter of this small diameter hole is set such that the air inside the case 2 is not discharged through the discharge passage 620 as long as the air outside the case 2 is not taken in and the air inside the case 2 continues to circulate through the circulation passage 5.

The discharge passage 620 includes a pressure valve 62. When air flows into the inner space of the case 2 through the second inflow passage 630 causing the inner pressure of the case 2 to increase, the pressure valve 62 operates to discharge the air overflowing from the circulation passage 5 to the outside. That is, by taking in the outside air into the case 2, the air around the bottom plate 22 is pushed out, and leaks to outside the case 2 through the discharge passage 620.

The discharge passage 620 is located downstream of the battery passages 52 through which the air blown from the fan device 4 passes to exchange heat with the battery cells, and upstream of the first inflow passage 54. Accordingly, the discharge passage 620 is a passage that allows part of the air circulating through the circulation passage 5 to overflow after having exchanged heat with the battery cells 3. The amount of the air overflowing to outside the case 2 is the same as the amount of the air taken in from outside the case 2 through the second inflow passage 630. Accordingly, the inner space of the case 2 is a closed space except the discharge passage 620 and the second inflow passage 630.

According to the first embodiment, the circulation passage 5 provided in the case 2 serves as an air distribution passage through which the air blown from the fan device 4 exchanges heat with the battery cells 3 and is sucked again to the fan device 4. The discharge passage 620 is a passage through which part of the air circulating in the case 2 leaks outside after having exchanged heat with the battery cells 3. This embodiment includes two inflow passages for the fan device 4. One is the first inflow passage 54 and the other is the second inflow passage 630. The first inflow passage 54, which is part of the circulation passage 5, is provided inside the case 2 to suck the air having exchanged heat with the battery cells 3. The second inflow passage 630 is a passage for making communication between the fan device 4 and the outside of the case 2. The air outside the case 2 is sucked into the circulation passage 5 through the second inflow passage 630 by the suction force of the fan device 4.

In this embodiment, fresh air is taken in from outside the case 2 by such an amount that a circulation flow of air can be maintained in the case 2 to continuously cool the battery cells 3. According to this embodiment, since the case 2 does not include an air inlet of large diameter or an air outlet of large diameter, the noise of the fan device 4 can be suppressed from transmitting to outside the case 2 compared to conventional battery cooling apparatuses where a large amount of air has to be taken in from the outside and discharged to the outside after being used to cool batteries. Further, since a sufficient amount of air circulation necessary to sufficiently absorb the heat from the battery cells 3 can be ensured, and the air in the case 2 can be sufficiently stirred by the air circulation, the heat absorption efficiency can be made high.

The circulation passage 5 provided in the case 2 is surrounded by the wall surfaces of the case 2. Since the wall surfaces surrounding the circulation passage 5 are used as heat dissipation medium, the heat dissipation surface can be made large easily to promote heat dissipation to outside the case 2. That is, it is possible to form a heat transfer path for effectively exhausting heat from the battery cells to outside the case 2. Hence, according to this embodiment, it is possible to use the entire of the wall surfaces of the case 2 as a heat dissipating area to effectively cool the battery cells.

Fresh air is sucked from outside the case 2 into the circulation passage 5 through the second inflow passage 630, and an amount of air equivalent to the amount of the sucked fresh air is discharged to outside the case 2 through the discharge passage 620. As explained above, according to this embodiment, it is possible to acquire fresh air necessary for performing efficient heat absorption while continuously exhausting heat accumulated in the case 2 by the continuous air circulation. Hence, the battery cooling apparatus 1 according to this embodiment can satisfy both noise reduction and efficient air cooling of the battery cells without requiring complicated refrigeration cycle equipment.

The discharge passage 620 is located downstream of the battery passages 52 through which the air blown from the fan device 4 passes to exchange heat with the battery cells, and upstream of the first inflow passage 54. This structural configuration enables reliably discharging the air having exchanged heat with the battery cells and increased in temperature to the outside from the discharge passage 620 so that the heat accumulated in the case 2 by continuous heat absorption by the continuous air circulation can be exhausted to the outside reliably.

The circulation passage 5 includes a passage part (the top plate side passage 51, for example) in which the air circulating in the case 2 flows while contacting at least one of the wall surfaces of the case 2 (the top plate 20, for example). According to this structural configuration, since the top plate side passage 51 constitutes part of circulation passage 5, for example, it is possible to dissipate heat to outside the case 2 through the top plate 20 when the circulating air flows through the top plate side passage 51. As explained above, since at least one of the wall surfaces of the case 2 can be used as a heat dissipation medium, it is possible to structure a heat transfer path for efficiently exhausting heat from the battery cells 3 to outside the case 2.

Preferably, the discharge passage 620 penetrates through one of the wall surfaces (bottom plate 22, for example) except the wall surface which the circulating air contacts while passing through the passage part (top plate side passage 51, for example). In this case, heat dissipation from the case 2 is performed at the top plate 20 as a heat dissipation surface, and air discharge from the discharge passage 620 is performed at one of the other wall surfaces. Accordingly, since the wall surface for promoting heat dissipation is distinguished from the wall surface for performing air discharge, the case 2 can be installed appropriately conforming to its ambient environment.

Preferably, the second inflow passage 630 penetrates through one of the wall surfaces (side plate 21, for example) except the wall surface which the circulating air contacts while passing through the passage part (top plate side passage 51, for example).

In this case, heat dissipation is performed at the top plate 20 as a heat dissipation surface of the case 2, and fresh air introduction through the second inflow passage 630 is performed at one of the other wall surfaces. Accordingly, since the wall surface for promoting heat dissipation is distinguished from the wall surface for performing fresh air introduction, the case 2 can be installed appropriately conforming to its ambient environment. If the second inflow passage 630 was provided in the heat dissipation surface, the discharged air would be sucked in again, causing the heat absorbed from the battery cells to return to the circulation passage 5.

Preferably, the wall surface which the circulating air contacts while passing through the passage part (top plate side passage 51, for example) is the one (top plate 20, for example) having the largest surface area of all the wall surfaces of the case 2, so that the heat dissipation efficiency can be made high to efficiently cool the battery cells. The wall surface having the largest surface area of the case 2 may be two or more in number.

Preferably, the wall surface which the circulating air contacts while passing through the passage part (top plate side passage 51, for example) is the one (top plate 20, for example) which is located upward of the case 2 and perpendicular to the side plate 21.

According to the findings of the inventors of the present invention, heat dissipation to outside the case 2 is made partially by heat radiation through the air flowing through the circulating passage 5 and the wall surfaces of the case 2. Further, according to the findings of the inventors, the heat dissipation to outside the case 2 by the heat radiation is prominent at the wall surface located upward of the case 2. Accordingly, by causing the air circulating through the circulation passage 5 to contact the upper wall surface of the case 2 (top plate 20, for example), the heat dissipation by the heat radiation can be promoted.

Preferably, the second inflow passage 630 extends from the fan device 4 to the vehicle cabin to make communication between fan device 4 and the vehicle cabin. In this case, air in the vehicle cabin can be introduced into the circulation passage 5 through the second inflow passage 630 to cool the battery cells 30 using the air in the air-conditioned vehicle cabin. For example, when the case 2 is installed in an environment higher in temperature than the vehicle cabin, the efficiency of absorbing heat from the battery cells 3 can be maintained high because air whose temperature is lower than the ambient temperature can be introduced into the case 2.

The discharge passage 620 is configured to open when applied with a pressure higher than a predetermined value to allow air to flow therein or therefrom. This makes it possible to prevent air from flowing therein or therefrom unnecessarily, to thereby reduce the noise emitting from the case 2. In addition, when the temperature of the inside of the case 2 should not be lowered to maintain the temperature of the battery cells within the target temperature range, it is possible to reduce heat dissipation from the case 2 to prevent the temperature of the inside of the case 2 from being lowered excessively.

Second Embodiment

Next, a battery cooling apparatus 101 according to a second embodiment of the invention is described with reference to FIG. 2 with a focus on differences with the first embodiment. The components or parts shown in FIG. 2 which are the same as or equivalent to those shown in FIG. 1 are indicated by the same reference numerals or characters.

The battery cooling apparatus 101 includes a case 102 housing therein the battery cells 3 constituting a cell stack and a fan device 104. The cell stack 103 is located downward inside the case 102. A top plate side passage 153 which constitutes part of a circulation passage 105 is provided above and alongside the cell stack 103.

Inside the case 2, there is formed a circulation passage 105 through which the fan device 104 forcibly blows air. The circulation passage 105 is a passage which allows the air blown by the fan device 4 to flow to exchange heat with the battery cells 3 and thereafter be sucked to the fan device 4. As shown in FIG. 2, the circulation passage 105 is constituted of a first inflow passage 154, a blowoff passage 150, a battery passage 152 and a top plate side passage 153. The top plate side passage 153 is constituted of a passage part extending from an air exit of the cell stack 103 upward along the side plate 122, a passage part located between the top plate 120 and the cell stack 103, and a passage part extending downward from the top plate 120 to the first inflow passage 154.

The cell stack 103 includes inter-cell passages between respective adjacent battery cells. The inter-cell passages form the battery passage 152. The battery passage 152 is surrounded by a battery case 160, and separated from the top plate side passage 153.

The fan device 104 may be an axial fan device having a propeller fan. The fan device 104 includes a blowoff guide part 144 having an orifice part as an inlet and a duct part for blowoff. The blowoff guide part 144 forms the first inflow passage 154 which is part of the circulation passage 5 at the inlet side, and forms the blowoff passage 150 which is part of the circulation passage 5 at the outlet side. This embodiment includes a cell monitoring unit which continuously monitors the temperature of the battery cells 3, and controls the fan device 104 device in accordance with the monitored temperature.

The first inflow passage 154 provided inside the case 102 is a passage which allows the air having exchanged heat with the battery cells 3 to flow to the fan device 104. The air blown from the fan device 104 to the blowoff passage 150 flows into the battery passage 152. The air flowing through the battery passage 52 absorbs heat from the outer surfaces of the battery cells 3 to cool the battery cells 3. In this embodiment, the outer package surfaces of the battery cells 3 serve as one of heat dissipating means. The air having exchanged heat with the battery cells 3 to cool the battery cells 3 dissipates heat to outside the case 2 through the top plate 120 by natural convection while passing through the top plate side passage 153.

Accordingly, the entire of the top plate 120 serves as a heat dissipation surface for dissipating heat of the battery cells 3 housed in the case 102 to outside the case 102. Preferably, the top plate 120 which the air circulating through the circulation passage 105 contacts while passing through the top plate side passage 153 is the wall surface having the largest surface area of all the wall surfaces of the case 102, so that the heat dissipation efficiency can be made high to efficiently cool the battery cells 3.

The circulation passage 105 is not exposed to any of the wall surfaces of the case 102 at its part constituted of the blowoff guide part 144 and the battery case 160, but exposed to at least one of the wall surfaces of the case 102 at the other parts. The circulation passage 105 includes a passage part through which the air circulating in the case 102 by the fan device 104 flows while contacting at least one of the wall surfaces of the case 102. Here, at least one of the wall surfaces of the case 2 which the air contacts are the top plate 120, the side plate 121 and the side plate 122, and the passage part through which the air flows while contacting at least one of the wall surfaces is the top plate side passage 153. The air passing through the top plate side passage 153 is the air having exchanged heat with the battery cells 3. After having flown through the top plate side passage 153, this circulating air further flows through the first inflow passage 154, the blowoff passage 150 and the battery passage 152 to exchange heat again with the battery cells 3.

This embodiment includes two inflow passages for the fan device 104. One is the first inflow passage 154 and the other is a second inflow passage 1630. The second inflow passage 1630 is a passage for making communication between the fan device 104 and the outside of the case 102. The second inflow passage 1630 is smaller in cross section than the first inflow passage 154. The second inflow passage 1630 is the inner passage of a supply duct 163 penetrating through the side plate 121 located at the side opposite the blowoff passage 150. The supply duct 163 makes communication between the first inflow passage 154 and the outside of the case 102. The air outside the case 102 is sucked into the circulation passage 105 through the second inflow passage 1630 by the suction force of the fan device 104.

The battery cooling apparatus 101 includes a discharge passage 1620 through which part of the air circulating in the case 102 leaks outside. The discharge passage 1620 penetrates through the side plate 122 to make communication between the inside and outside of the case 102.

The discharge passage 1620 is formed of a small diameter hole penetrating through the case 102. Around this small diameter hole, a ring portion thinner than any other portions of the case 102 is formed. The diameter of this small diameter hole is set to such a value that the air inside the case 102 is not discharged through the discharge passage 1620 as long as the air outside the case 102 is not taken in and the air inside the case 102 continues to circulate through the circulation passage 105.

The discharge passage 1620 includes a pressure valve 162. When air flows into the inner space of the case 102 through the second inflow passage 1630 causing the inner pressure of the case 102 to increase, the pressure valve 162 operates to discharge the air overflowing from the circulation passage 105 to the outside. That is, by taking in the outside air in the case 102, the air around the bottom plate 122 is pushed out, and leaks to outside the case 102 through the discharge passage 1620.

The discharge passage 1620 is located downstream of the battery passage 152 which the air blown from the fan device 104 passes to exchange heat with the battery cells 3, and upstream of the first inflow passage 154. Accordingly, the discharge passage 620 is a passage through which part of the air circulating through the circulation passage 105 leaks outside after having exchanged heat with the battery cells 3. The amount of the air overflowing to outside the case 102 from the discharge passage 1620 is the same as the amount of the air taken in from outside the case 102 through the second inflow passage 1630. Accordingly, the inner space of the case 102 is a closed space except the discharge passage 1620 and the second inflow passage 1630.

The specific structure of the battery cooling apparatus 101 provides various advantages. Preferably, the wall surface which the air passing through the circulation passage 105 contacts includes at least one of the side surfaces (side plates 121 and 122, for example) and the upper wall surface (top plate 120, for example) perpendicular to the side plate 121.

According to the findings of the inventors of the present invention, heat dissipation to outside the case 102 is made by heat radiation through the air flowing through the circulating passage 105 and the wall surfaces of the case 102 and by natural convection. As explained in the foregoing, heat dissipation to outside the case 102 by the heat radiation is prominent at the upward wall surface of the case 102, and heat dissipation to outside the case 102 by the natural convection is prominent at the side plates 121 and 122.

According to the structure of this embodiment, it is possible to promote the heat radiation by causing the air circulating through the circulation passage 105 to contact the top plate 120, and to promote the natural convection by causing the air circulating through the circulation passage 105 to contact the side plates 121 and 122. Further, as shown in FIG. 2, in the case where the air circulating through the circulation passage 105 is caused to contact the top plate 120 and the side plates 121 and 122, both heat radiation and natural convection can be promoted. Hence, according to this embodiment, heat dissipation to outside the case 102 can be performed effectively by utilizing at least one of the heat radiation and the natural convection.

Third Embodiment

Next, a battery cooling apparatus 201 according to a third embodiment of the invention is described with reference to FIG. 3 with a focus on differences with the first embodiment. The components or parts shown in FIG. 3 which are the same as or equivalent to those shown in FIG. 1 are indicated by the same reference numerals or characters.

The battery cooling apparatus 201 includes, as one of heat dissipating means, heat dissipating bus bars 7 formed with fins 70. The heat dissipating bus bar 7 is made of a conductive metal plate. The heat dissipating bus bar can be fabricated by forming the fins 70 in a copper member shaped in a bar by forging the copper member or by cutting and raising the copper member. Alternatively, the heat dissipating bus bar may be fabricated by joining the bus bar 7 and the fin 70 together by welding.

The other heat dissipating means of the battery cells 3 is heat dissipating plates 8 held between respective adjacent two of the battery cells 8. The heat dissipating plate 8, which is made of a heat-conductive metal plate, thermally connect adjacent battery cells 3 together. In this embodiment, the heat dissipating plate 8 made of aluminum is provided so as to be in intimate contact with the surface of each battery cell 3. The heat dissipating plate 8 may be provided on the surface of each battery cell 3 with a heat dissipating sheet having a good heat conductivity interposed therebetween.

One end part of the heat dissipating plate 8 projects toward a bottom plate side passage 252A. This end part of the heat dissipating plate 8 is formed with a heat dissipating bent portion 80 bent in a corrugated shape to increase the heat dissipation area so that the heat dissipating plate 8 can efficiently exchange heat with the air circulating through a circulation passage 205 also in the bottom plate side passage 252A.

The battery cooling apparatus 201 includes a case 202 housing therein the battery cells 3 constituting a cell stack 203 and a fan device 204. The cell stack 203 is provided with a top plate side passage 252 which forms part of the circulation passage 205 upward inside of the case 202, and with the bottom plate side passage 252A forming part of the circulation passage 105 below the top plate side passage 252. A side plate side passage 253 which constitutes part of the circulation passage 205 is provided alongside the cell stack 203.

Inside the case 202, there is formed the circulation passage 205 through which the fan device 204 forcibly blows air. The circulation passage 205 is a passage which allows the air blown by the fan device 204 to flow to exchange heat with the battery cells 3 and thereafter be sucked to the fan device 204. As shown in FIG. 3, the circulation passage 205 is constituted of a first inflow passage 254, a blowoff passage 250, the top plate side passage 252, the side plate side passage 253 and the bottom plate side passage 252A.

The fan device 204 has the similar structure to the fan device 4 described in the first embodiment. Differences between the fan device 204 and the fan device 4 are as follows. The inlet of a casing 243 of the fan device 204 is not connected with a duct that forms a passage. Accordingly, the first inflow passage 254 is a passage which is located at the side of the battery cells 2, faces the inner space of the case 202 and communicates with the bottom plate side passage 252A. A motor 241, a sirrocco fan 240, the casing 243 and a fan duct 244 correspond respectively to the motor 41, the sirrocco fan 40, the casing 43 and the fan duct 44 described in the first embodiment.

The circulation passage 205 is not exposed to any one of the wall surfaces of the case 202 at its part constituted of the fan duct 244, but exposed to at least one of the wall surfaces of the case 202 at the top plate side passage 252, the side plate side passage 253 and the bottom plate side passage 252A. The circulation passage 205 includes a passage part through which the air circulating in the case 202 by the fan device 204 flows while contacting at least one of the wall surfaces of the case 202. Here, the top plate 220, the side plate 221 and the bottom plate 222 are at least one of the wall surfaces which the circulating air contacts. The top plate side passage 252 is the passage part through which the air flows while contacting the top plate 220. The side plate side passage 253 is the passage part through which the air flows while contacting the side plate 221. The bottom plate side passage 252A is the passage part through which the air flows while contacting the bottom plate 222.

The air blown from the fan device 204, passing through the blowoff passage 250 and reaching the vicinity of the top plate 220 flows through the top plate side passage 252 while contacting and exchanging heat with the bus bars 7 and the fins 70 of the battery cells 3. Further, the air descends in the side plate side passage 253 and flows through the bottom plate side passage 252A while contacting and exchanging heat with the heat dissipating bent portion 80 of the heat dissipating plate 8. The air having exchanged heat to cool the battery cells 3 is sucked from the bottom plate side passage 252A into the fan device 204 through the first inflow passage 254, and flows to the top plate side passage 252 through the top plate side passage 252 to exchange heat again with the battery cells 3.

The air having exchanged heat with the battery cells 3 to cool the battery cells 3 dissipates heat to outside the case 202 through the top plate 220 by natural convection while flowing through the top plate side passage 252. Further, the air having exchanged heat with the battery cells 3 to cool the battery cells 3 dissipates heat to outside the case 202 through the bottom plate 222 by natural convection while flowing through the bottom plate side passage 252A.

Accordingly, the entire of the top plate 220 and the bottom plate 222 serves as a heat dissipation surface for dissipating heat of the battery cells 3 housed in the case 202 to outside the case 2. Preferably, the top plate 220 which the air circulating in the circulation passage 205 contacts while passing through the top plate side passage 252 and the bottom plate 222 which the air circulating in the circulation passage 205 contacts while passing through the bottom plate side passage 252A are the wall surfaces having the largest surface area of all the wall surfaces of the case 202, so that the heat dissipation efficiency can be made high to efficiently cool the battery cells 3. When the case 202 has a rectangular shape and the wall surface having the largest surface area is two in number, the bottom plate 222 is one of such wall surfaces.

This embodiment includes two inflow passages for the fan device 204. One is the first inflow passage 254 and the other is a second inflow passage 2630. The second inflow passage 2630 is a passage for making communication between the fan device 204 and the outside of the case 202. The second inflow passage 2630 is smaller in cross section than the first inflow passage 254. The second inflow passage 2630 is the inner passage of a supply duct 263 whose opening end is located in the vicinity of the inlet of the casing 243.

The supply duct 263 penetrates through the bottom plate 222 of the case 202 to make communication between the inlet of the casing 243 and the outside of the case 202. The supply duct 263 extends downward outside the case 202. Accordingly, the air inlet of the supply duct 263 is located more downward than the bottom plate 222. The air sucked into the supply duct 263 from its air inlet is introduced into the circulation passage 205 through the second inflow passage 2630 to enter inside the case 202.

A discharge passage 2620 and a pressure valve 262 of the third embodiment respectively correspond to the discharge passage 620 and the pressure valve 62 of the first embodiment.

The discharge passage 2620 is located downstream of the top plate side passage 252 which the air blown from the fan device 204 passes to exchange heat with the battery cells 3, and upstream of the first inflow passage 254. Accordingly, the discharge passage 2620 is a passage through which part of the air circulating through the circulation passage 205 leaks outside after having exchanged heat with the battery cells 3. The amount of the air overflowing to outside the case 202 from the discharge passage 2620 is the same as the amount of the air taken in from outside the case 202 through the second inflow passage 2630. Accordingly, the inner space of the case 202 is a closed space except the discharge passage 2620 and the second inflow passage 2630.

In the third embodiment, the heat dissipating means includes the heat dissipating plate 8 provided so as to be in intimate contact with the side surface of each battery cell 3 for dissipating heat from the side surface, or the heat dissipating bus bar electrically connected to each battery cell 3. According to the third embodiment, since heat dissipation from the battery cells 3 is performed utilizing the heat dissipating bus bars or the heat dissipating plates 8, the battery cooling capacity can be increased.

The specific structure of the battery cooling apparatus 201 provides various advantages. Preferably, the wall surface which the circulating air contacts while passing through the circulation passage 205 includes at least one of the side surfaces (side plates 221, for example) and the upper wall surface (top plate 220, for example) perpendicular to the side plate 221.

As explained in the foregoing, heat dissipation to outside the case 202 by the heat radiation is prominent at the top plate 220, and heat dissipation to outside the case 102 by the natural convection is prominent at the side plate 221. According to the structure of this embodiment, it is possible to promote the heat radiation by causing the air circulating through the circulation passage 205 to contact the top plate 220, and to promote the natural convection by causing the air circulating through the circulation passage 205 to contact the side plate 221. Further, as shown in FIG. 3, in the case where the air circulating through the circulation passage 205 is caused to contact the top plate 220 and the side plate 221, both the heat radiation and the natural convection can be promoted.

Other Embodiments

It is a matter of course that various modifications can be made to the above described embodiments as described below.

Figure 2:
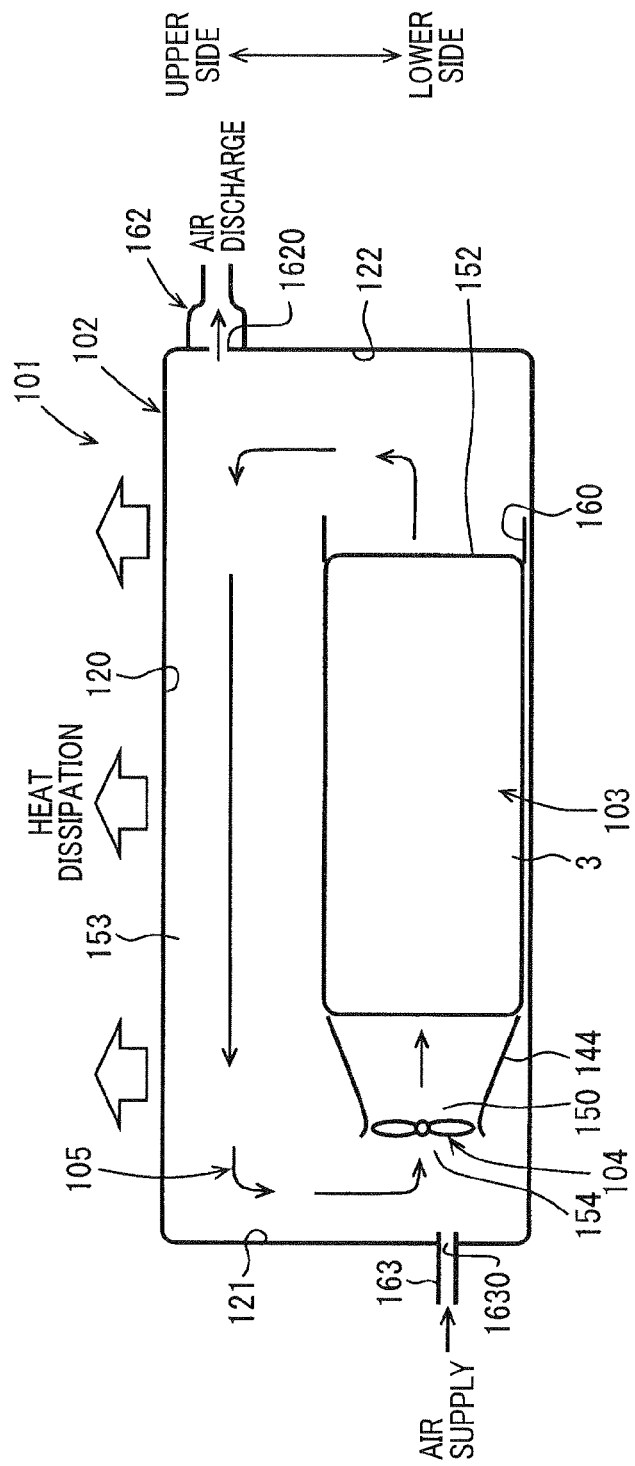
FIG. 2 is a diagram for explaining flows of air for battery cooling in a battery cooling apparatus according to a second embodiment of the invention.

In each of the above embodiments shown in FIGS. 1 to 3, air is sucked into the fan device (4, 104, 204) through the single first inflow passage (54, 154, 254). However, air may be sucked into the fan device through two or more inflow passages.

Each of the fan device 4 provided in the case 2 and the fan device 204 provided in the case 202 may include an axial fan or a turbo fan instead of the sirrocco fan. The fan device 104 provided in the case 102 may include a sirrocco fan or a turbo fan instead of the axial fan.

In each of the cases 2, 102 and 202, the wall surface having the largest surface area is the top plate. However, the wall surface having the largest surface area may be the side plate.

The end part of the heat dissipating plate of the battery cooling apparatus 201 according to the third embodiment may not be formed with the bent portion. Further, the bent portion may be replaced with a flat plate-like portion.

The above explained preferred embodiments are exemplary of the invention of the present application which is described solely by the claims appended below. It should be understood that modifications of the preferred embodiments may be made as would occur to one of skill in the art.

What is claimed is:

1. A battery cooling apparatus comprising:
a case for housing battery cells arranged in the casing;
a fan device disposed in the case and configured to blow air to cool the battery cells;
a circulation passage formed inside the case and including a collective passage, a top plate side passage and battery passages extending in parallel from portions of the top plate side passage, wherein the circulation passage is configured so that the air blown from the fan device is sucked into the fan device after having circulated through the circulation passage, and having collected in the collective passage after having exchanged heat with the battery cells each of the battery passages extends from a portion of the top plate side passage to the collective passage through a respective one of the battery cells so that a portion of the air, after moving through the top plate passage, flows along a surface of one of the battery cells to the collective passage; and
a discharge passage configured to provide communication between inside and outside of the case to allow part of the air that circulates through the circulation passage to leak to outside the case through the discharge passage after having exchanged heat with the battery cells, the discharge passage including a pressure valve that is configured to open when a predetermined pressure condition is satisfied so that the discharge passage discharges air;
wherein
the fan device includes a first inflow passage and a second inflow passage,
the first inflow passage is part of the circulation passage and configured to allow the air having exchanged heat with the battery cells to be sucked into the fan device through the first inflow passage,
the second inflow passage is configured to provide communication between the outside of the case and the fan device to allow air outside the case to be sucked into the circulation passage through the second inflow passage by negative pressure which is produced by the fan device in the second inflow passage and arises from the discharge of the air through the pressure valve,
the collective passage extends in a direction along which the battery cells are arranged and each of the battery cells is exposed to the collective passage, and
the discharge passage is disposed downstream of a first passage part of the circulation passage and upstream of the first inflow passage so that the air blown from the fan device can exchange heat with the battery cells while passing through the first passage part.

2. The battery cooling apparatus according to claim 1, wherein the circulation passage includes a second passage part configured so that the air blown from the fan device can pass through the second passage part while contacting at least one of wall surfaces constituting the case, so as to dissipate the heat of the air through the wall surfaces.

3. The battery cooling apparatus according to claim 2, wherein the discharge passage penetrates through one of the wall surfaces except the wall surface which the air blown from the fan device contacts while passing through the second passage part.

4. The battery cooling apparatus according to claim 2, wherein the second inflow passage penetrates through one of the wall surfaces except the wall surface which the air blown from the fan device contacts while passing through the second passage part.

5. The battery cooling apparatus according to claim 2, wherein the wall surface which the air blown from the fan device contacts while passing through the second passage part has the largest surface area of all the wall surfaces constituting the case.

6. The battery cooling apparatus according to claim 2, wherein the wall surface which the air blown from the fan device contacts while passing through the second passage part is at least one of side surfaces of the case and a top surface of the case perpendicular to the side surfaces.

7. The battery cooling apparatus according to claim 1, wherein an amount of air discharged from the discharge passage when the predetermined pressure condition is satisfied corresponds to an amount of air sucked into the circulation passage through the second inflow passage.

8. The battery cooling apparatus according to claim 1, wherein the second inflow passage extends from the fan device to a vehicle cabin.

* * * * *